Patented Oct. 21, 1947

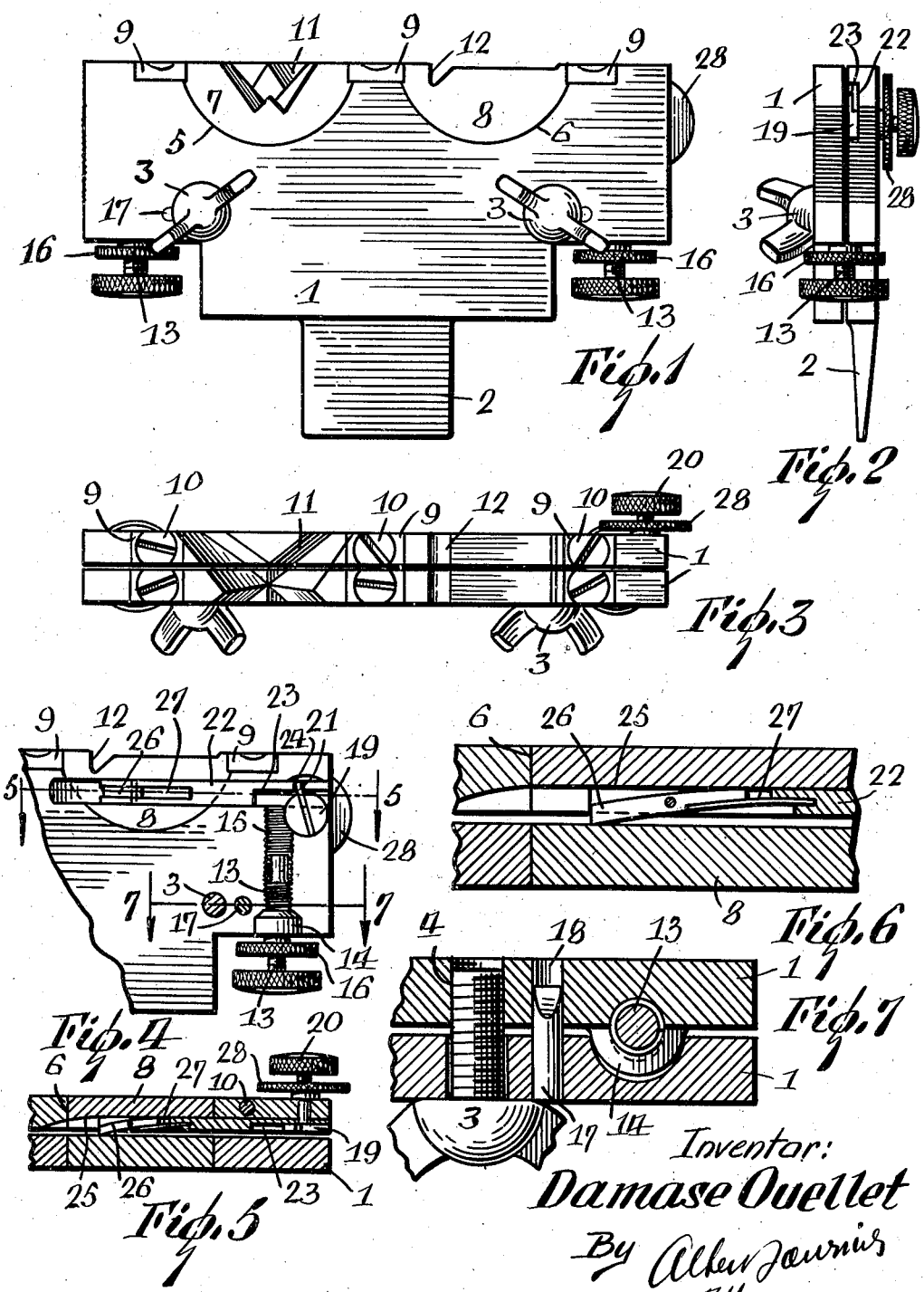

2,429,292

UNITED STATES PATENT OFFICE 2,429,292

SAW VISE

Damase Ouellet, La Tuque, Quebec, Canada

Application July 5, 1946, Serial No. 681,543

5 Claims. (Cl. 76—36)

The present invention pertains to a novel vise for use in setting saws.

The principal object of the invention is to provide a simple, efficient and inexpensive device of this character that is easily portable to the job. Another object of the invention is to provide such a device wherein the longitudinal position of the saw can be accurately adjusted.

In the accomplishment of these objects, the device comprises a pair of like plates clamped one against the other by suitable means such as a pair of screws. The plates may be made of soft or inferior metal and are provided in their upper edges with hardened inserts which are replaceable and are suitably grooved and shaped for the particular type of saw that is to be sharpened.

The height of the saw between the plates is determined by a pair of screws threaded between the plates at their lower edges and directed towards the upper edges. The elevation of the saw is of course determined while the clamping screws are loose. The longitudinal position of the saw is effected manually while the clamping screws are loose. For accurate positioning, however, a mechanical means is provided. This means comprises a block between the plates and provided with a dog which bears against one of the saw teeth. A finger is rotatably mounted in one of the plates and has a slidable engagement with the block in order to move the latter longitudinally as the finger is turned. For this turning operation, the cylindrical plug has an external stem with a large head that permits fine adjustments.

The invention is fully disclosed by way of example in the following description and in the accompanying drawings in which:

Figure 1 is a side elevation of the device;

Figure 2 is an end view;

Figure 3 is a plan view;

Figure 4 is a split elevation;

Figure 5 is a section on the line 5—5 of Figure 4;

Figure 6 is an enlarged detail of Figure 5, and

Figure 7 is a section on the line 7—7 of Figure 4.

Reference to these views will now be made by use of like characters which are employed to designate corresponding parts throughout.

The device comprises a pair of like plates 1 lying in juxtaposition to each other and adapted to clamp the saw between them. On the lower edge of one of the plates is formed a sharpened blade 2 adapted to be driven into the stump of a tree or other block of wood on the job. The clamping of the plates 1 is accomplished in any suitable manner, as by means of screws 3 passed loosely through one of the plates and threaded at 4 into the other plate, as shown in Figure 7.

In the upper edge of each plate is formed a pair of recesses 5 and 6. The plates may be made of soft steel, and the recesses 5, 6 receive hardened inserts 7 and 8 respectively. The inserts are held down by retaining blocks 9 removably fastened in the upper edges of the plates by screws 10. The inserts 7 are specially shaped at 11 to provide guiding grooves for the particular saw being filed. The inserts 7 are of course interchangeable for various styles of saws. The inserts 8 are notched at 12 for raker teeth.

The height of the saw between the plates 1 is adjusted by screws 13 extending vertically between the plates. One of the plates may be fitted with semi-circular collars 14 receiving the screws, and the screws are threaded into the collars and in screw threads formed in both opposite plates, as indicated by the numeral 15. Lock nuts 16 are provided on the outer ends of the screws 13. For accurate alinement of the plates, one of them carries a peg or dowel 17 received in an aperture 18 in the opposite plate.

In order to adjust the saw accurately in the longitudinal direction on loosening the screws 3, one of the plates 1 carries a cylindrical plug 19 mounted rotatably on a transverse horizontal axis and provided with an operating stem 20. A finger 21 extends radially from the plug and is adapted to actuate a longitudinally sliding block 22. For this purpose the latter has a reduced end 23 overlying the plug 9 and formed with a notch 24 in which the finger 21 is received.

The opposite end of the block 22 is slitted lengthwise at 25 and has a dog 26 pivotally mounted therein. In the bottom of the slot is inserted a leaf spring 27 forcing the adjacent end of the dog against one of the plates and the outer end of the dog against the other plate, as illustrated more clearly in Figure 6. The last named end of the dog is inserted between the teeth of the saw (not shown), and it is now evident adjustment of the plug 19 displaces the dog 26 and hence the saw to the desired position. The external portion of the stem 20 is threaded and receives a lock nut 28, as shown in Figure 5.

Although a specific embodiment of the invention has been illustrated and described, it will be understood that various alterations in the details of construction may be made without departing from the scope of the invention as indicated by the appended claims.

What I claim as my invention is:

1. A saw vise comprising a pair of plates, means for clamping said plates together, replaceable inserts in the upper edges of said plates, said inserts having guide grooves formed therein, a block slidable longitudinally between said plates, a dog pivotally carried by said block and adapted to engage a saw tooth, and means for adjusting the position of said block.

2. A saw vise comprising a pair of plates, means for clamping said plates together, replaceable inserts in the upper edges of said plates, said inserts having guide grooves formed therein, a block slidable longitudinally between said plates, a dog pivotally carried by said block and adapted to engage a saw tooth, a cylindrical plug rotatably mounted transversely in one of said blocks, and a pin extending from said plug into said block for sliding the latter.

3. A saw vise comprising a pair of plates, means for clamping said plates together, replaceable inserts in the upper edges of said plates, said inserts having guide grooves formed therein, a block slidable longitudinally between said plates, a dog pivotally carried by said block and adapted to engage a saw tooth, a spring fastened in said block and bearing on one end of said dog to turn the same on its pivot, and means for adjusting the position of said block.

4. A saw vise comprising a pair of plates, means for clamping said plates together, replaceable inserts in the upper edges of said plates, said inserts having guide grooves formed therein, a block slidable longitudinally between said plates, a dog pivotally carried by said block and adapted to engage a saw tooth, a spring fastened in said block and bearing on one end of said dog to turn the same on its pivot, a cylindrical plug rotatably mounted transversely in one of said blocks, and a pin extending from said plug into said block for sliding the latter.

5. A saw vise comprising a pair of plates, means for clamping said plates together, replaceable inserts in the upper edges of said plates, said inserts having guide grooves formed therein, supporting screws mounted adjustably in the lower edges of said block and directed towards the upper edges, a block slidable longitudinally between said plates, a dog pivotally carried by said block and adapted to engage a saw tooth, and means for adjusting the position of said block.

DAMASE OUELLET.

REFERENCES CITED

The following references are of record in the file of this patent:

UNITED STATES PATENTS

| Number | Name | Date |
|---|---|---|
| 2,019,330 | Altman | Oct. 29, 1935 |
| 2,166,567 | Hall et al. | July 18, 1939 |
| 1,475,351 | Phillips | Nov. 27, 1923 |